(No Model.)

B. B. DAVIS & J. F. McGOWAN.
BICYCLE SUPPORT.

No. 514,815.  Patented Feb. 13, 1894.

WITNESSES:
Fred G. Dieterich
P. B. Turpin.

INVENTORS:
Benjamin B. Davis
James F. McGowan
BY
Munn & Co
ATTORNEYS.

UNITED STATES PATENT OFFICE.

BENJAMIN BIBB DAVIS AND JAMES F. McGOWAN, OF ATHENS, GEORGIA.

BICYCLE-SUPPORT.

SPECIFICATION forming part of Letters Patent No. 514,815, dated February 13, 1894.

Application filed July 7, 1893. Serial No. 479,782. (No model.)

*To all whom it may concern:*

Be it known that we, BENJAMIN BIBB DAVIS and JAMES F. McGOWAN, of Athens, in the county of Clarke and State of Georgia, have invented a new and useful Improvement in Bicycle-Supports, of which the following is a specification.

This invention is an improvement in bicycle supports and has for an object to provide a simple, inexpensive attachment which may be readily applied to and removed from the machine and will be efficient when adjusted to support the same, and the invention consists in the novel constructions and combinations of parts as will be hereinafter described and pointed out in the claims.

Figure 1:
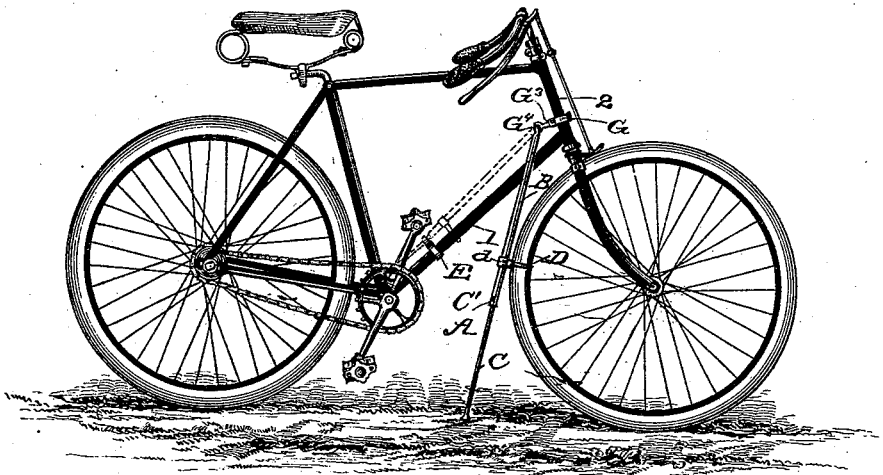
Figure 2:
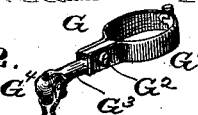
Figure 5:
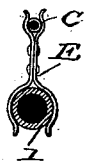
Figure 3:
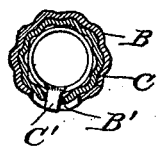
Figure 3:
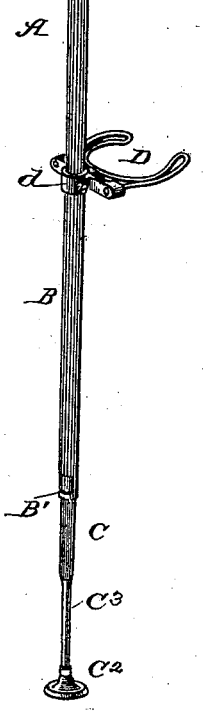
Figure 4:
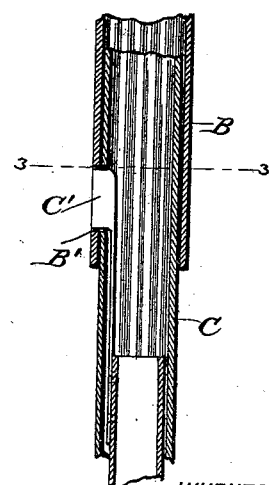

In the drawings—Figure 1 is a side view of a bicycle showing the improvement in full lines as in use and folded in dotted lines.
Fig. 2 is a detail view of the support. Fig. 3 is a detail section illustrating the spring latch and the seat therefor. Fig. 4 is a detail view illustrating the latch mechanism for holding the support extended and Fig. 5 is a detail view illustrating the clasp for securing the support when not in use.

The improved device consists of the extensible prop having at one end a fastening by which it may be secured to the bicycle frame at front rod between the upper and lower main tubes and provided between its ends with a clasp adapted to engage and scotch the wheel, the free end of the prop being adapted to rest upon the ground.
The prop A is extensible being formed in upper and lower telescopic sections B and C, the lower section C fitting in the section B and having near its inner end a radially movable latch C' that catches in the extended adjustment of the prop in a seat B' in the section B such seat being preferably an opening formed in section B near its lower end. The latch C' is a spring pressed lug and the parts D and C are keyed from turning. This may preferably be accomplished by ribbing the sections B and C or otherwise making them non-circular or it may be effected in circular sections by providing a key in one section to fit in a groove in the other in the usual manner of keying. This permits the longitudinal extension of the sections and yet insures the movement of the latch into engagement with the seat B'. To release the latch so the prop can be closed it is only necessary to push it in when the sections may be pushed together. In the construction shown and as preferred, the latch is secured to and carried by a plug like support which is fitted in the inner or lower section C, the point of the latch operating through an opening in said section and fitting snugly in such opening to exclude dirt as will be readily understood from the drawings.

Upon the props, preferably upon the section B is secured a clasp D which embraces and scotches the machine front wheel, locking the same from turning so that even if the machine be left on a slight grade it will not roll off the support. This clasp is in the nature of a yoke or fork having a sleeve $d$ embracing the prop and secured by a set screw so the clasp may be adjusted to embrace the wheel of any machine to which the support may be applied. Now it will be seen that the prop may be set to one or the other side of the machine and may be adjusted laterally to or in the direction of length of the machine so that the wheel scotching clasp may be set to engage the wheel whether such wheel be in alignment with the machine frame or at an angle thereto and the adjustment of the said clasp upon the prop aids in adapting it to clasp wheels of different diameters.

In addition to its function of scotching the wheel the clasp D is useful in guiding the prop into its fastening clasp E the clasp D being so arranged that in applying the prop to the machine it—by bracing the frame bar, operates to guide the prop into the clasp E.

At its lower end the section C is adapted to rest upon the ground or other surface preferably by providing a padded head $C^2$ at such end, as shown and directly above said head the section C is slightly reduced at $C^3$ to adapt it to be received in and held by a spring clasp E supported on the lower main bar 1 of the bicycle frame.

The fastening G for securing the support to the bicycle frame consists of a hinged padded ring G' adapted to embrace and be clamped by its screw G² to the neck forging 2 of the machine and having a projecting shank G³ connected by a gimbal or similar universal joint G⁴ to the top of the prop so the latter may be adjusted to rest at its lower end upon the ground when in use or be turned up and held by the spring clasp upon the bar 1 when not in use.

It will be seen that the connection of the prop with the neck or standard of the machine is important as by it the prop is connected at a point near the top of the machine and is in position to support the machine more firmly than if connected lower down.

When in use the support presents a good appearance, and when contracted and held upon the bar 1 it in no wise detracts from the appearance of the machine.

Having thus described our invention, what we claim as new, and desire to secure by Letters Patent, is—

1. An improved bicycle prop consisting of the extensible prop a fastening and a universal joint for connecting said prop with the machine, whereby it may be adjusted both laterally to and in the direction of length of the machine, and a clasp secured to said prop between the ends of the latter and adapted to scotch the front wheel all substantially as described whereby the prop may be adjusted to secure the said front wheel whether the same be in or to one side of the plane of the machine substantially as set forth.

2. An improved bicycle prop having a universal joint whereby it may be connected with the frame and provided with a clasp adapted to scotch the wheel and adjustable upon the prop whereby it may be set to engage wheels of different diameters substantially as set forth.

3. The combination of the bicycle, the prop holding clasp secured to the frame, the prop, a universal joint connecting the said prop with the frame, and the wheel scotching clasp secured to the prop between the ends of the latter and arranged and adapted to guide the prop into engagement with its holding clasp substantially as set forth.

4. The combination of the bicycle the prop having a connection for securing it to the bicycle and provided with a universal joint and a clasp supported by said prop between the ends thereof and adapted to scotch the bicycle wheel substantially as set forth.

BENJAMIN BIBB DAVIS.
JAMES F. McGOWAN.

Witnesses to the signature of Davis:
H. R. PALMER,
SYLVANUS MORRIS.

Witnesses to the signature of McGowan:
JAMES H. GRIDLEY,
SOLON C. KEMON.